(12) United States Patent
Koufaty et al.

(10) Patent No.: US 11,030,126 B2
(45) Date of Patent: Jun. 8, 2021

(54) TECHNIQUES FOR MANAGING ACCESS TO HARDWARE ACCELERATOR MEMORY

(71) Applicant: INTEL CORPORATION, Santa Clara, CA (US)

(72) Inventors: David A. Koufaty, Portland, OR (US); Rajesh M. Sankaran, Portland, OR (US); Stephen R. Van Doren, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 797 days.

(21) Appl. No.: 15/650,112

(22) Filed: Jul. 14, 2017

(65) Prior Publication Data

US 2019/0018806 A1  Jan. 17, 2019

(51) Int. Cl.
*G06F 3/06* (2006.01)
*G06F 13/16* (2006.01)
(Continued)

(52) U.S. Cl.
CPC ........ *G06F 13/1663* (2013.01); *G06F 3/0604* (2013.01); *G06F 9/467* (2013.01);
(Continued)

(58) Field of Classification Search
CPC .............. G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS 9,348,385 B2 * 5/2016 de Rochemont ....... H01L 25/16
9,859,918 B1 * 1/2018 Gopal ....................... G06F 8/65
(Continued)

FOREIGN PATENT DOCUMENTS

WO 2013036639 A1 3/2013

OTHER PUBLICATIONS

M. Alam and K. S. Perumalla, "GPU-based parallel algorithm for generating massive scale-free networks using the preferential attachment model," 2017 IEEE International Conference on Big Data (Big Data), Boston, MA, 2017, pp. 3302-3311 (Year: 2017).*
(Continued)

*Primary Examiner* — Daniel C. Chappell
(74) *Attorney, Agent, or Firm* — Kacvinsky Daisak Bluni PLLC

(57) ABSTRACT

Techniques and apparatus to manage access to accelerator-attached memory are described. In one embodiment, an apparatus to provide coherence bias for accessing accelerator memory may include at least one processor, a logic device communicatively coupled to the at least one processor, a logic device memory communicatively coupled to the logic device, and logic, at least a portion comprised in hardware, the logic to receive a request to access the logic device memory from the logic device, determine a bias mode associated with the request, and provide the logic device with access to the logic device memory via a device bias pathway responsive to the bias mode being a device bias mode. Other embodiments are described and claimed.

25 Claims, 11 Drawing Sheets

(51) Int. Cl.
 *G06F 15/78* (2006.01)
 *G06F 9/46* (2006.01)
 *G06F 21/71* (2013.01)
 *G06F 12/10* (2016.01)
 *G06F 21/79* (2013.01)
(52) U.S. Cl.
 CPC .......... *G06F 12/10* (2013.01); *G06F 13/1668* (2013.01); *G06F 15/7821* (2013.01); *G06F 21/71* (2013.01); *G06F 21/79* (2013.01)
(58) Field of Classification Search
 CPC ....... G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
 See application file for complete search history.

(56) References Cited

U.S. PATENT DOCUMENTS

| | | | |
|---|---|---|---|
| 10,191,684 B2* | 1/2019 | Gopal | G06F 3/0608 |
| 10,282,811 B2* | 5/2019 | Ray | G06F 12/0888 |
| 10,469,252 B2* | 11/2019 | Schmisseur | G06F 3/0613 |
| 10,776,144 B2* | 9/2020 | Chandran | H04L 69/329 |
| 2009/0193197 A1 | 7/2009 | Stevens et al. | |
| 2010/0321397 A1* | 12/2010 | Ginzburg | G06F 12/109 345/531 |
| 2011/0060879 A1 | 3/2011 | Rogers et al. | |
| 2013/0262776 A1* | 10/2013 | Asaro | G06F 12/0848 711/135 |
| 2014/0055467 A1* | 2/2014 | Bittner | G06T 1/60 345/520 |
| 2015/0081984 A1* | 3/2015 | Blankenship | G06F 12/0808 711/143 |
| 2016/0077976 A1* | 3/2016 | Raikin | G06F 13/385 711/207 |
| 2017/0060606 A1* | 3/2017 | Hollinger | G06F 9/5016 |
| 2019/0004990 A1* | 1/2019 | Van Doren | G06F 13/4234 |

OTHER PUBLICATIONS

International Search Report and Written Opinion for International Application No. PCT/US2018/035063, dated Sep. 19, 2018, 12 pages.
European Search Report and Written Opinion for the EP Application No. EP18832379, dated Feb. 4, 2021, 7 pages.

* cited by examiner

TECHNIQUES FOR MANAGING ACCESS TO HARDWARE ACCELERATOR MEMORY

TECHNICAL FIELD

Embodiments herein generally relate to information processing, and more particularly, to managing memory associated with a hardware accelerator of a computing system.

BACKGROUND

Computing systems include various components to manage demands on processor resources. For example, developers may include a hardware accelerator (or "accelerator") operably coupled to a central processing unit (CPU). In general, an accelerator is an autonomous element configured to perform functions delegated to it by the CPU. An accelerator may be configured for specific functions and/or may be programmable. For instance, an accelerator may be configured to perform specific calculations, graphics functions, and/or the like. When an accelerator performs an assigned function, the CPU is free to devote resources to other demands. In conventional systems, the operating system (OS) may manage the physical memory available within the computing system (for instance, "system memory"); however, the OS does not manage or allocate memory that is local to an accelerator. As a result, memory protection mechanisms, such as cache coherency, introduce inefficiencies into accelerator-based configurations. For instance, conventional cache coherence mechanisms limit the ability of an accelerator to access its attached, local memory at very high bandwidth and/or limit deployment options for the accelerator.

DETAILED DESCRIPTION

Various embodiments may be generally directed to techniques for providing cache coherence between a plurality of components within a processing system. In some embodiments, the plurality of components may include a processor, such as a central processing unit (CPU), and a logic device communicatively coupled to the processor. In various embodiments, the logic device may include a local, attached memory. In some embodiments, the plurality of components may include a processor communicatively coupled to an accelerator having a local, attached memory (for instance, logic device memory). In some embodiments, the processing system may operate a coherence bias process configured to provide a plurality of cache coherence processes. In some embodiments, the plurality of cache coherence processes may include a device bias process and a host bias process (together, "bias protocol flows"). In some embodiments, the host bias process may route requests to the local, attached memory of the logic device through a coherence component of the processor, including requests from the logic device. In some embodiments, the device bias process may route logic device requests for logic device memory directly to the logic device memory, for instance, without consulting the coherence component of the processor. In various embodiments, the cache coherence process may switch between the device bias process and the host bias processes based on a bias indicator determined using application software, hardware hints, a combination thereof, and/or the like. Embodiments are not limited in this context.

Figure 1:
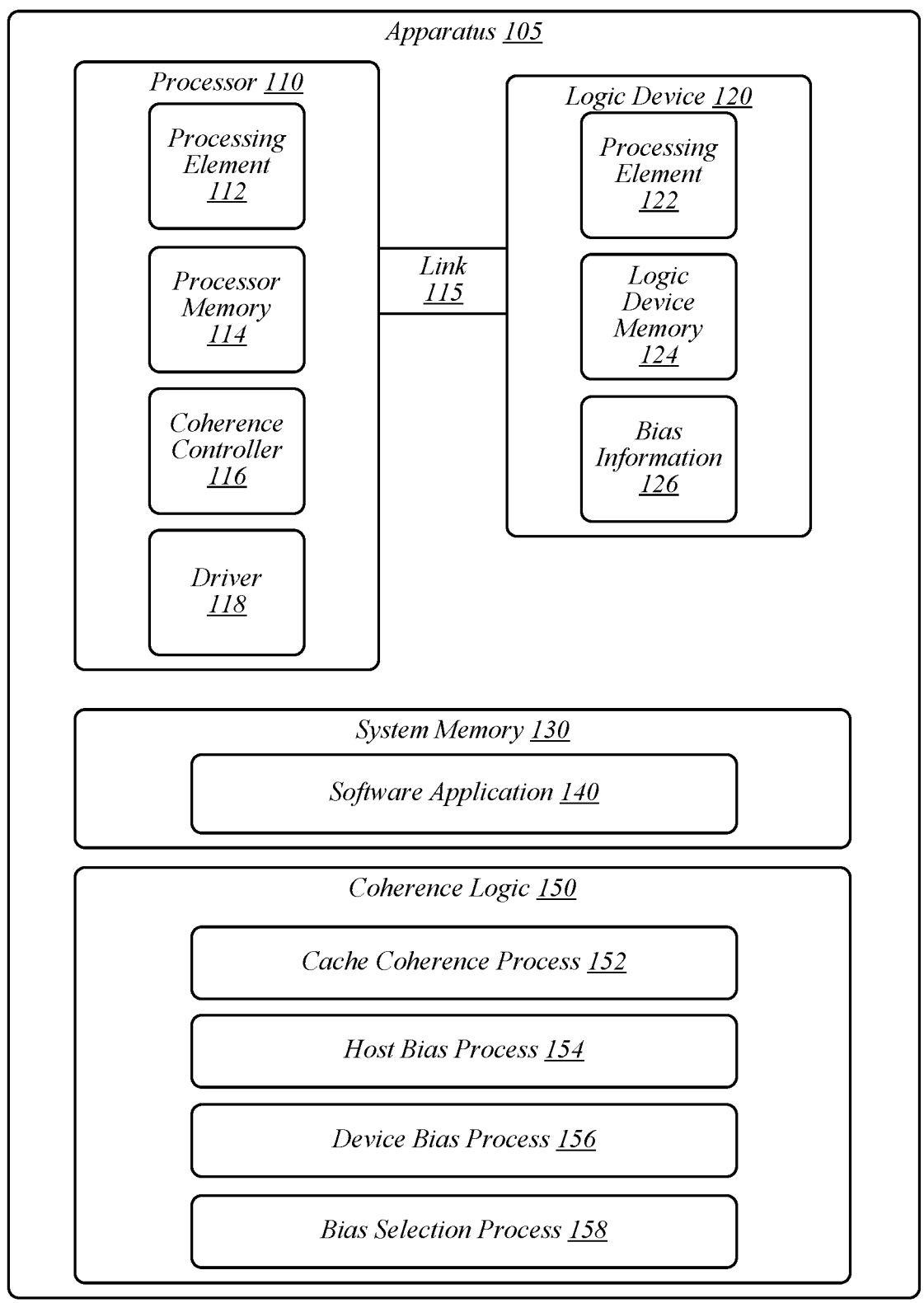
FIG. 1 illustrates an embodiment of a first operating environment.

FIG. 1 illustrates an example of an operating environment 100 that may be representative of various embodiments. The operating environment 100 depicted in FIG. 1 may include an apparatus 105 having a processor 110, such as a central processing unit (CPU). Processor 110 may include any type of computational element, such as but not limited to, a microprocessor, a microcontroller, a complex instruction set computing (CISC) microprocessor, a reduced instruction set (RISC) microprocessor, a very long instruction word (VLIW) microprocessor, a virtual processor (for example, a VCPU), or any other type of processor or processing circuit. In some embodiments, processor 110 may be one or more processors in the family of Intel® processors available from Intel® Corporation of Santa Clara, Calif. Although only one processor 110 is depicted in FIG. 1, apparatus may include a plurality of processors 110. Processor 110 may include a processing element 112, for instance, a processing core. In some embodiments, processor 110 may include a multi-core processor having a plurality of processing cores. In various embodiments, processor 110 may include processor memory 114, which may include, for instance, a processor cache or local cache memory to facilitate efficient access to data being processed by processor 110. In some embodiments, processor memory 114 may include random access memory (RAM); however, processor memory 114 may be implemented using other memory types such as dynamic RAM (DRAM), synchronous DRAM (SDRAM), combinations thereof, and/or the like.

As shown in FIG. 1, processor 110 may be communicatively coupled to a logic device 120 via a link 115. In various embodiments, logic device 120 may include a hardware device. In various embodiments, logic device 120 may include an accelerator. In some embodiments, logic device 120 may include a hardware accelerator. In various embodiments, logic device 120 may include an accelerator implemented in hardware, software, or any combination thereof. Although an accelerator may be used as an example logic device 120 in this Detailed Description, embodiments are not so limited as logic device 120 may include any type of device, processor (for instance, a graphics processing unit (GPU)), logic unit, circuitry, integrated circuit, application-specific integrated circuit (ASIC), field-programmable gate array (FPGA), memory unit, computational unit, and/or the like capable of operating according to some embodiments. In an embodiment in which logic device 120 includes an accelerator, logic device 120 may be configured to perform one or more functions for processor 110. For example, logic device 120 may include an accelerator operative to perform graphics functions (for instance, a GPU or graphics accelerator), floating point operations, fast Fourier transform (FFT) operations, and/or the like. In some embodiments, logic device 120 may include an accelerator configured to operate using various hardware components, standards, protocols, and/or the like. Non-limiting examples of types of accelerators and/or accelerator technology capable of being used by logic device may include OpenCAPI™, CCIX, GenZ, NVIDIA® NVLink™, Accelerator Interfacing Architecture (AIA), cache coherent agent (CCA), globally mapped and coherent device memory (GCM), Intel® Graphics Media Accelerator (GMA), Intel® virtualization technology for directed input/output (I/O) (for instance, VT-d, VT-x, and/or the like), shared virtual memory (SVM), and/or the like. Embodiments are not limited in this context.

Logic device 120 may include a processing element 122, such as a processing core. In some embodiments, logic device 120 may include a plurality of processing elements 122. Logic device 120 may include logic device memory 124, for example, configured as a local, attached memory for logic device 120. In some embodiments, logic device memory 124 may include local memory, cache memory, and/or the like. In various embodiments, logic device memory 124 may include random access memory (RAM); however, logic device memory 124 may be implemented using other memory types such as dynamic RAM (DRAM), synchronous DRAM (SDRAM), combinations thereof, and/or the like. In some embodiments, at least a portion of logic device memory 124 may be visible or accessible by processor 110. In some embodiments, at least a portion of logic device memory 124 may be visible or accessible by processor 110 as system memory (for example, as an accessible portion of system memory 130).

In various embodiments, processor 110 may execute a driver 118. In some embodiments, driver 118 may be operative to control various functional aspects of logic device 120 and/or to manage communication with one or more applications that use logic device 120 and/or computational results generated by logic device 120. In various embodiments, logic device 120 may include and/or may access bias information 126. In some embodiments, bias information 126 may include information associated with a coherence bias process. For example, bias information 126 may include information indicating which cache coherence process may be active for logic device 120 and/or a particular process, application, thread, memory operation, and/or the like. In some embodiments, bias information 126 may be read, written, or otherwise managed by driver 118.

In some embodiments, link 115 may include a bus component, such as a system bus. In various embodiments, link 115 may include a communications link operative to support multiple communication protocols (for instance, a multi-protocol link). Supported communication protocols may include standard load/store IO protocols for component communication, including serial link protocols, device caching protocols, memory protocols, memory semantic protocols, directory bit support protocols, networking protocols, coherency protocols, accelerator protocols, data storage protocols, point-to-point protocols, fabric-based protocols, on-package (or on-chip) protocols, fabric-based on-package protocols, and/or the like. Non-limiting examples of supported communication protocols may include peripheral component interconnect (PCI) protocol, peripheral component interconnect express (PCIe or PCI-E) protocol, universal serial bus (USB) protocol, serial peripheral interface (SPI) protocol, serial AT attachment (SATA) protocol, Intel® QuickPath Interconnect (QPI) protocol, Intel® UltraPath Interconnect (UPI) protocol, Intel's® Optimized Accelerator Protocol (OAP), Intel® Accelerator Link (IAL), intra-device interconnect (IDI) protocol (or IAL.cache), Intel® On-Chip Scalable Fabric (IOSF) protocol (or IAL.io), scalable memory interconnect (SMI) protocol (or IAL.mem), SMI 3rd generation (SMI3), and/or the like. In some embodiments, link 115 may support an intra-device protocol (for instance, IDI) and a memory interconnect protocol (for instance, SMI3). In various embodiments, link 115 may support an intra-device protocol (for instance, IDI), a memory interconnect protocol (for instance, SMI3), and a fabric-based protocol (for instance, IOSF).

In some embodiments, apparatus 105 may include system memory 130. In various embodiments, system memory 130 may include main system memory for apparatus 105. System memory 130 may store data and sequences of instructions that are executed by processor 110, or any other device or component of apparatus 105. In some embodiments, system memory 130 may be implemented using RAM; however, system memory 130 may be implemented using other memory types such as dynamic DRAM, SDRAM, combinations thereof, and/or the like. In various embodiments, system memory 130 may store a software application 140 (for example, "host software") executable by processor 110. In some embodiments, software application 140 may use or otherwise be associated with logic device 120. For instance, software application 140 may be configured to use computations results generated by logic device 120.

Apparatus may include coherence logic 150 to provide cache coherence processes. In various embodiments, coherence logic 150 may be implemented in hardware, software, or a combination thereof. In some embodiments, at least a portion of coherence logic 150 may be arranged in, partially arranged in, or otherwise associated with processor 110. For example, in some embodiments, coherence logic 150 for a cache coherence element or process 152 may be arranged within processor 110. In some embodiments, processor 110 may include a coherence controller 116 to perform various cache coherence processes, such as cache coherence process 152. In some embodiments, cache coherence process 152 may include one or more standard cache coherence techniques, functions, methods, processes, elements (including hardware or software elements), protocols, and/or the like performed by processor 110. In general, cache coherence process 152 may include a standard protocol for managing the caches of a system so that no data is lost or overwritten before the data is transferred from a cache to a target memory. Non-limiting examples of standard protocols performed or supported by cache coherence process 152 may include snoop-based (or snoopy) protocols, write invalidate protocols, write update protocols, directory-based protocols, hardware-based protocols (for instance, a modified exclusive shared invalid (MESI) protocol), private memory-based protocols, and/or the like. In some embodiments, cache coherence process 152 may include one or more standard cache coherence protocols to maintain cache coherence for a logic device 120 having an attached logic device memory 124. In some embodiments, cache coherence process 150 may be implemented in hardware, software, or a combination thereof.

In some embodiments, coherence logic 150 may include coherence bias processes such as a host bias process or element 154 and a device bias process or element 156. In general, coherence bias processes may operate to maintain cache coherence relating to requests, data flows, and/or other memory operations relating to logic device memory 122. In some embodiments, at least a portion of coherence logic, such as host bias process 154, device bias process 156, and/or a bias selection component 158 may be arranged outside of processor 110, for example, in one or more individual coherence logic 150 units. In some embodiments, host bias process 154, device bias process 156, and/or bias selection component 158 may be implemented in hardware, software, or a combination thereof.

In some embodiments, host bias process 154 may include techniques, processes, data flows, data, algorithms, and/or the like that process requests for logic device memory 124 through cache coherence process 152 of processor 110, including requests from logic device 120. In various embodiments, device bias process 156 may include techniques, processes, data flows, data, algorithms, and/or the like that allow logic device 120 to directly access logic device memory 124, for example, without using cache coherence process 152. In some embodiments, bias selection process 158 may include techniques, processes, data flows, data, algorithms, and/or the like for activating host bias process 154 or device bias process 156 as an active bias process for requests associated with logic device memory. In various embodiments, the active bias process may be based on bias information 126, which may include data, data structures, and/or processes used by bias selection process to determine the active bias process and/or to set the active bias process.

Figure 2A:
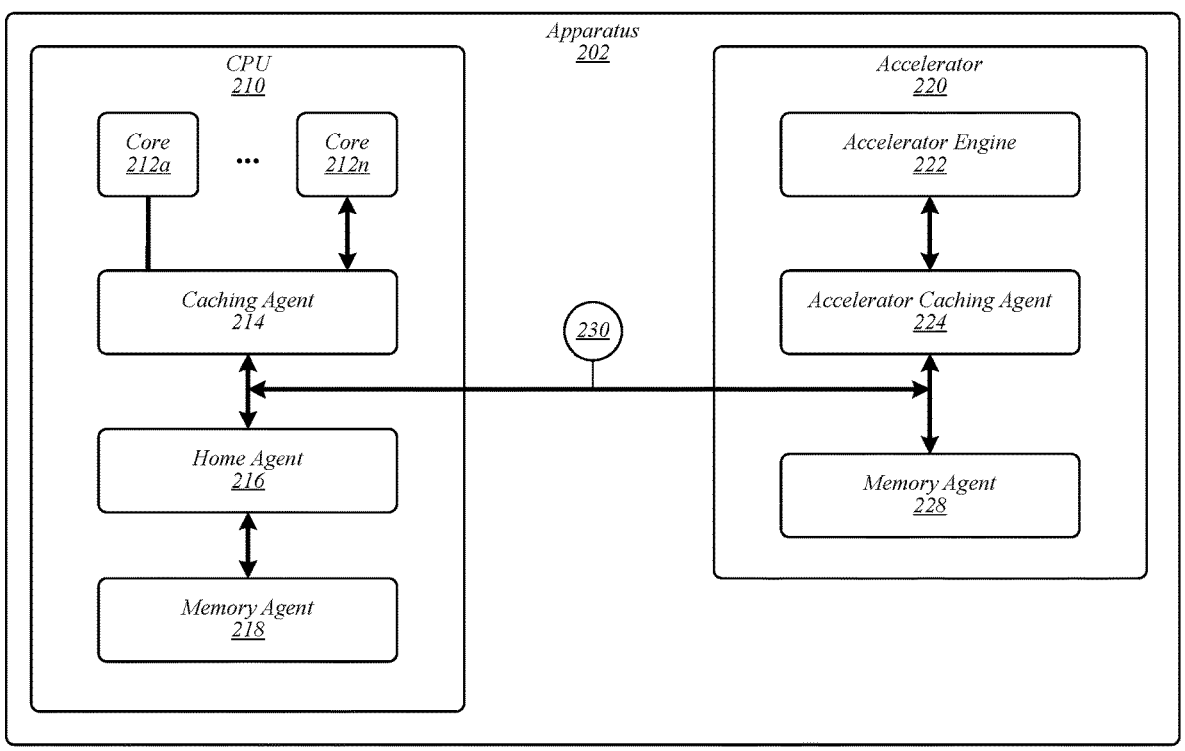
FIG. 2A illustrates an example of a full-coherence operating environment.

FIG. 2A illustrates an example of a full-coherence operating environment 200A. The operating environment 200A depicted in FIG. 2A may include an apparatus 202 having a CPU 210 that includes a plurality of processing cores 212a-n. As shown in FIG. 2A, CPU may include various protocol agents, such as a caching agent 214, home agent 216, memory agent 218, and/or the like. In general, caching agent 214 may operate to initiate transactions into coherent memory and to retain copies in its own cache structure. Caching agent 214 may be defined by the messages it may sink and source according to behaviors defined in a cache coherence protocol associated with CPU. Caching agent 214 may also provide copies of the coherent memory contents to other caching agents (for instance, accelerator caching agent 224). Home agent 216 may be responsible for the protocol side of memory interactions for CPU 210, including coherent and non-coherent home agent protocols. For example, home agent 216 may order memory reads/writes. Home agent 216 may be configured to service coherent transactions, including handshaking as necessary with caching agents. Home agent 216 may operate to supervise a portion of the coherent memory of CPU 210, for example, maintaining the coherency for a given address space. Home agent 216 may be responsible for managing conflicts that may arise among the different caching agents. For instance, home agent 216 may provide the appropriate data and ownership responses as required by a given transaction's flow. Memory agent 218 may operate to manage access to memory. For example, memory agent 218 may facilitate memory operations (for instance, load/store operations) and functions (for instance, swaps, and/or the like) for CPU 210.

As shown in FIG. 2A, apparatus 202 may include an accelerator 220 operatively coupled to CPU 210. Accelerator 220 may include an accelerator engine 222 operative to perform functions (for instance, calculations, and/or the like) offloaded by CPU 210. Accelerator 220 may include an accelerator caching agent 224 and a memory agent 228.

Accelerator 220 and CPU 210 may be configured according to and/or to include various conventional hardware and/or memory access techniques. For instance, as shown in FIG. 2A, all memory accesses, including those initiated by accelerator 220, must go through pathway 230. Pathway may include a non-coherent link, such as a PCIe link. In the configuration of apparatus 202, accelerator engine 222 may be able to directly access accelerator caching agent 224 and memory agent 228, but not caching agent 214, home agent 216, or memory agent 218. Similarly, cores 212a-n would not be able to directly access memory agent 228. Accordingly, the memory behind memory agent 228 would not be part of the system address map seen by cores 212a-n. Because cores 212a-n can't access a common memory agent, data can only be exchanged via copies. In certain implementations, a driver may be used to facilitate the copying of data back and forth between memory agents 218 and 228. For example, drivers can include a run-time element that creates a shared memory abstraction that hides all of the copies from the programmer. In contrast, and described in detail below, some embodiments may provide for configurations in which requests from an accelerator engine may be forced to cross a link between the accelerator and the CPU when the accelerator engine wants to access an accelerator memory, such as via an accelerator agent 228.

Figure 2B:
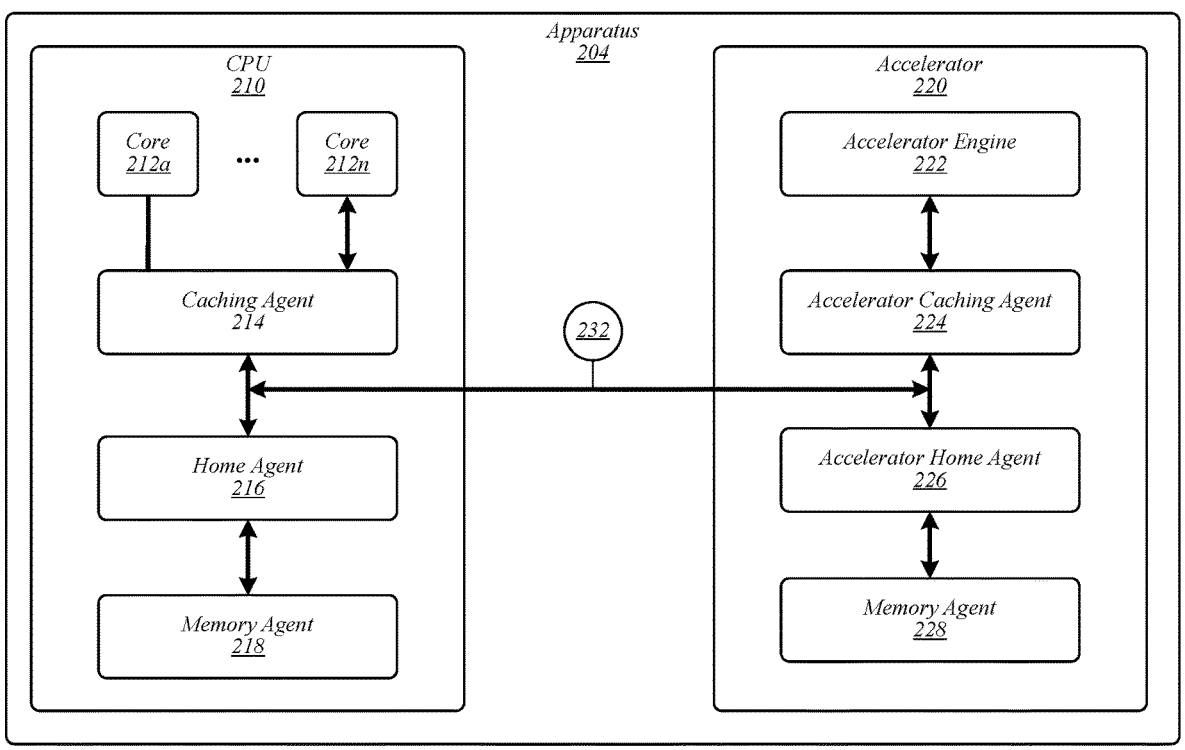
FIG. 2B illustrates an example of a non-coherent link operating environment.

FIG. 2B illustrates an example of a coherent operating environment 200B. The operating environment 200B depicted in FIG. 2B may include an accelerator 220 having an accelerator home agent 226. CPU 210 and accelerator 220 may be operably coupled via a coherent pathway 232, such as a UPI pathway or a COX pathway.

For the operation of apparatus 204, accelerator engine 222 and cores 212a-n can access both memory agents 228 and 218. Cores 212a-n can access memory 218 without crossing link 232, and accelerator agent 222 can access memory 228 without crossing link 232. In addition, cores 212a-n may also access memory 228 and accelerator engine 222 may also access memory 218. The cost of those local accesses, for example from cores 212a-n to memory 218, accelerator engine 222 to memory 228, cores 212a-n to memory 228, and accelerator engine 222 to memory 218, is that home agent 226 needs to be built such that it can track coherency for all accesses from cores 212a-n to memory 228. This requirement leads to complexity and high resource usage when apparatus 204 includes multiple CPU 210 devices all connected via other instances of link 232. Home agent 226 needs to be able to track coherency for all cores 212a-n on all instances of CPU 210. This can become quite expensive in terms of performance, area, and power, particularly for large configurations. Specifically, it negatively impacts the performance efficiency of accesses between accelerator engine 222 and memory 228 for the benefit of accesses from the CPUs 210, even though the accesses from the CPUs 210 are expected to be relatively rare. For instance, in a process involving substantial streaming write memory traffic, cache coherence overhead may cut the effective write bandwidth seen by accelerator 220 in half.

Figure 2C:
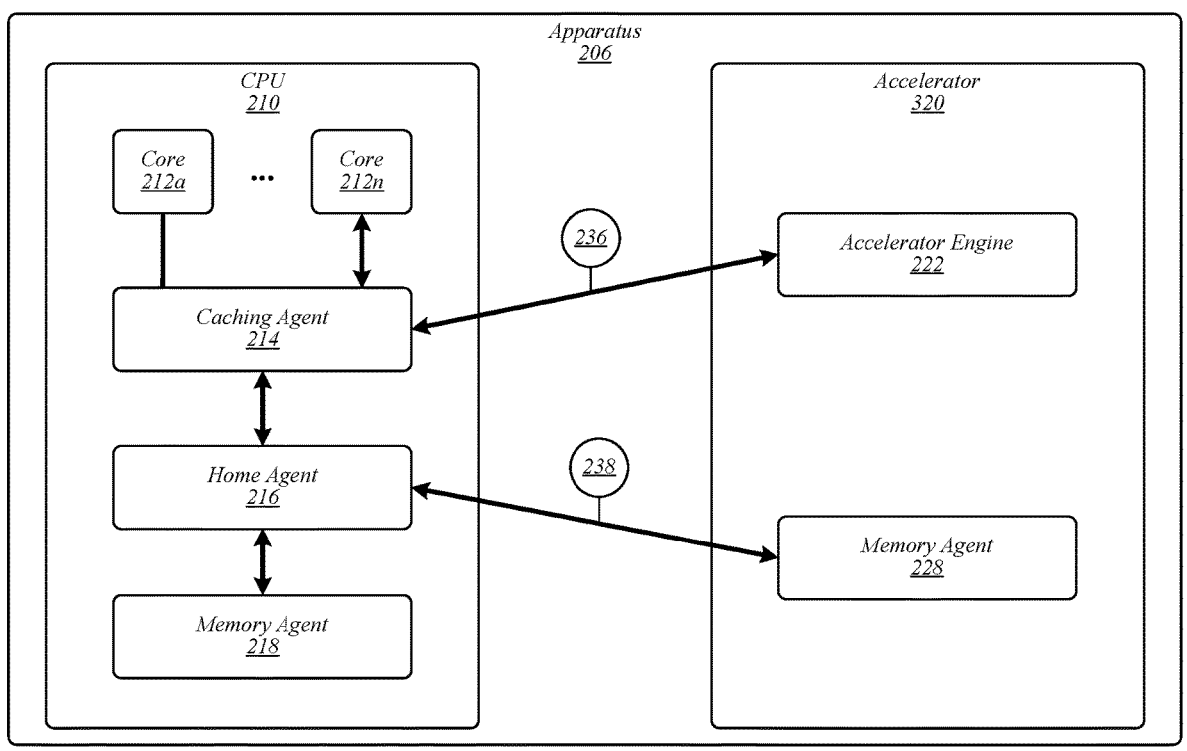
FIG. 2C illustrates an example of a coherence engine without bias operating environment.

FIG. 2C illustrates an example of a coherence engine without bias operating environment 200C. As shown in FIG. 2, apparatus 206 may include an accelerator 220 operatively coupled to CPU 210 via coherent links 236 and 238. Accelerator 220 may include an accelerator engine 222 operative to perform functions (for instance, calculations, and/or the like) offloaded by CPU 210. Accelerator 220 may include an accelerator caching agent 224, an accelerator home agent 226, and a memory agent 228.

In the configuration of apparatus 206, accelerator 220 and CPU 210 may be configured according to and/or to include various conventional hardware and/or memory access techniques, such as CCIX, GCM, standard coherency protocols (for instance, symmetric coherency protocols), and/or the like. For instance, as shown in FIG. 2, all memory accesses, including those initiated by accelerator 220, must go through one or both of pathways 236 or 238. In this manner, accelerator 220 must go through CPU 220 (and, therefore, coherency protocols associated with CPU) in order to access accelerator memory (for instance, through memory agent 228). In addition, the bandwidth to memory agent 228 may be limited by the bandwidth of pathways 236 and/or 238. Accordingly, apparatus 206 may provide the ability to access certain memory, such as accelerator-attached memory associated with accelerator 220, as part of system memory (for instance, as part of a system address map), which may allow host software to setup operands and access computational results of accelerator 220 without the overhead of, for example, I/O direct memory access (DMA) data copies. Such data copies may require driver calls, interrupts, and memory-mapped I/O (MMIO) access that are all inefficient and complex as compared to memory accesses. The inability to access accelerator-attached memory without cache coherence overheads, as depicted in FIG. 2C, may be detrimental to the execution time of a computation offloaded to accelerator 220.

The efficiency of operand setup, results access, and accelerator computation play a role in determining the effectiveness and benefits of offloading CPU 210 work to accelerator 220. If the cost of offloading work is too high, offloading may not be beneficial or may be limited to only very large jobs. Accordingly, various developers have created accelerators which attempt to increase the efficiency of using an accelerator, such as accelerator 220, with limited effectiveness compared with technology configured according to some embodiments. For instance, certain conventional GPUs may operate without mapping the accelerator-attached memory as part of the system address map or without using certain virtual memory configurations (for example, SVM) to access the accelerator-attached memory. Accordingly, in such systems, accelerator-attached memory is not visible to host system software. Rather, accelerator-attached memory is accessed only via a run-time layer of software provided by the GPUs device driver. A system of data copies and page table manipulations is used to create the appearance of a virtual memory (for example, SVM) enabled system. Such a system is inefficient, particularly compared to some embodiments, because, among other things, the system requires memory replication, memory pinning, memory copies, and complex software. Such requirements lead to substantial overhead at memory page transition points that are not required in systems configured according to some embodiments. In certain other systems, conventional hardware coherence mechanism are employed for memory operations associated with accelerator-attached memory, which limits the ability of an accelerator to access the accelerator-attached memory at a high bandwidth and/or limits the deployment options for a given accelerator (for instance, accelerators attached via an on-package or off-package link cannot be supported without substantial bandwidth loss).

In general, conventional systems may use one of two methods for accessing accelerator-attached memory: a full coherence (or full hardware coherence) method or a private memory model or method. The full coherence method requires that all memory accesses, including accesses requested by an accelerator for accelerator-attached memory, must go through the coherence protocol of the corresponding CPU. In this manner, the accelerator must take a circuitous route to access accelerator-attached memory as the request must be transmitted at least to the corresponding CPU, through the CPU coherence protocol, and then to the accelerator-attached memory. Accordingly, the full coherence method carries coherence overhead when an accelerator accesses its own memory that can substantially impair the data bandwidth that an accelerator may extract from its own attached memory. The private memory model requires significant resource and time costs, such as memory replication, page pinning requirements, page copy data bandwidth costs, and/or page transition costs (for instance, translation lookaside buffer (TLB) shoot-downs, page table manipulation, and/or the like). Accordingly, some embodiments may provide a coherence bias process configured to provide a plurality of cache coherence processes that provide, among other things, better memory utilization and improved performance for systems that include accelerator-attached memory compared with conventional systems.

Figure 3:
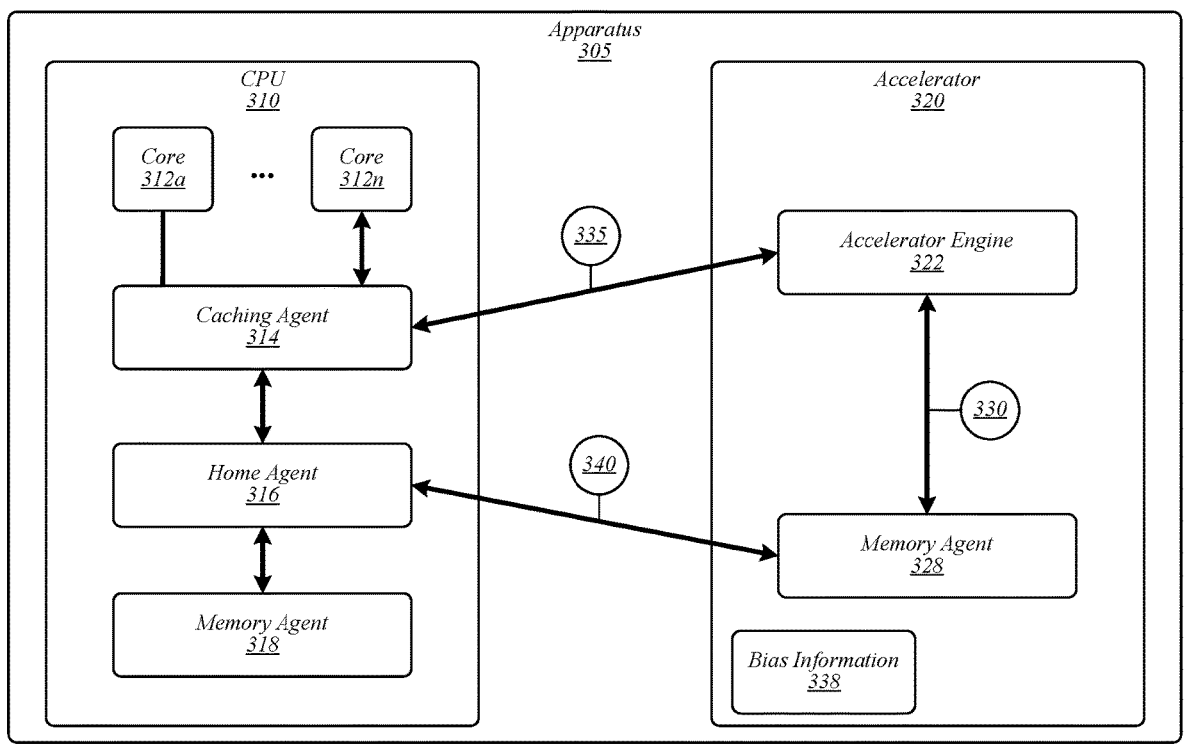
FIG. 3 illustrates an embodiment of a second operating environment.

FIG. 3 illustrates an example of an operating environment 300 that may be representative of various embodiments. The operating environment 300 depicted in FIG. 3 may include an apparatus 305 operative to provide a coherence bias process according to some embodiments. In some embodiments, apparatus 305 may include a CPU 310 having a plurality of processing cores 312a-n and various protocol agents, such as a caching agent 314, home agent 316, memory agent 318, and/or the like. CPU 310 may be communicatively coupled to accelerator 320 using various links 335, 340. Accelerator 320 may include an accelerator engine 312 and a memory agent 318, and may include or access bias information 338.

As shown in FIG. 3, accelerator engine 322 may be communicatively coupled directly to memory agent 328 via a biased coherence bypass 330. In various embodiments, accelerator 320 may be configured to operate in a device bias process in which biased coherence bypass 330 may allow memory requests of accelerator engine 322 to directly access accelerator-attached memory (not shown) of accelerator facilitated via memory agent 328. In various embodiments, accelerator 320 may be configured to operate in a host bias process in which memory operations associated with accelerator-attached memory may be processed via links 335, 340 using cache coherency protocols of CPU, for instance, via caching agent 314 and home agent 316. Accordingly, accelerator 320 of apparatus 305 may leverage the coherency protocols of CPU 310 when appropriate (for instance, when a non-accelerator entity requests accelerator-attached memory) while allowing accelerator 320 direct access to accelerator-attached memory via biased coherence bypass 330.

In some embodiments, coherence bias (for instance, whether device bias or host bias is active) may be stored in bias information 338. In various embodiments, bias information 338 may include and/or may be stored in various data structures, such as a data table (for instance, a "bias table"). In some embodiments, the bias information 338 may include a bias indicator with a value indicating the active bias (for instance, 0=host bias, 1=device bias). In some embodiments, the bias information 338 and/or bias indicator may be at various levels of granularity, such as memory regions, page tables, address ranges, and/or the like. For instance, bias information 338 may specify that certain memory pages are set for device bias, while other memory pages are set for host bias. In some embodiments, bias information 338 may include a bias table configured to operate as a low cost, scalable snoop filter.

Figure 4:
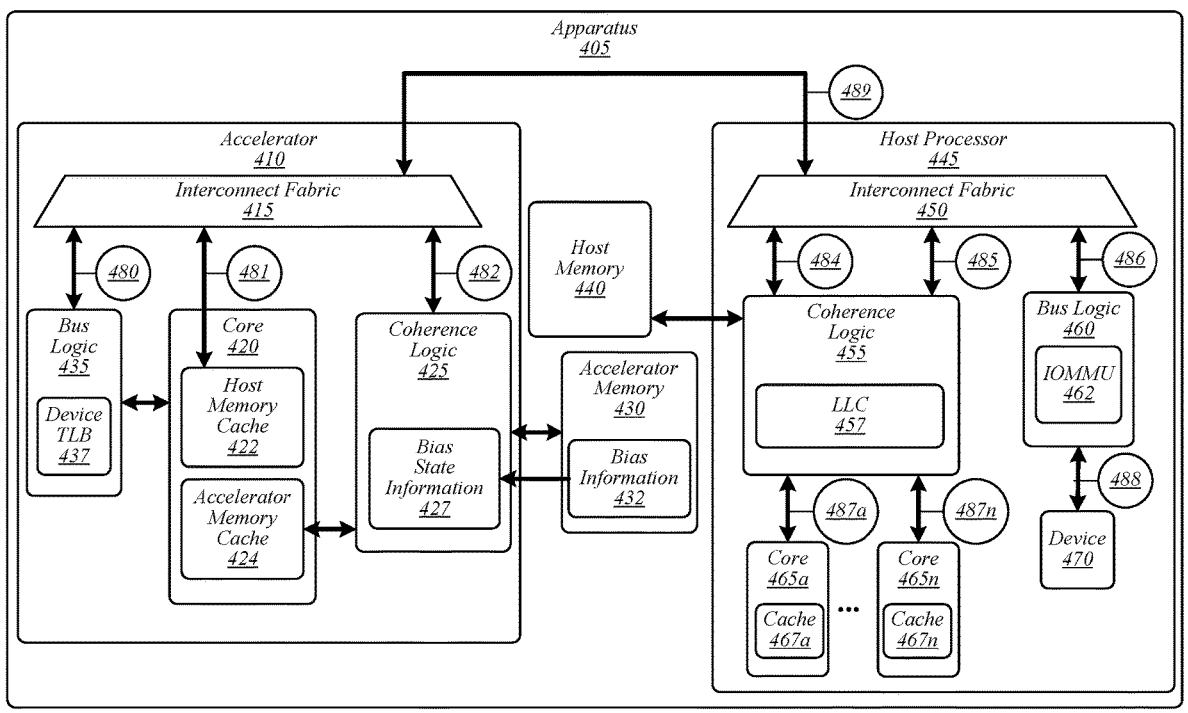
FIG. 4 illustrates an embodiment of a third operating environment.

FIG. 4 illustrates an example of an operating environment 400 that may be representative of various embodiments. The operating environment 400 depicted in FIG. 4 may include an apparatus 405 operative to provide a coherence bias process according to some embodiments. Apparatus 405 may include an accelerator 410 communicatively coupled to a host processor 445 via a link (or multi-protocol link) 489. Accelerator 410 and host processor 445 may communicate over link 489 using interconnect fabrics 415 and 450, respectively, that allow data and messages to pass therebetween. In some embodiments, link 489 may include a multi-protocol link operable to support multiple protocols. For example, link 489 and interconnect fabrics 415 and 450 may support various communication protocols, including, without limitation, serial link protocols, device caching protocols, memory protocols, memory semantic protocols, directory bit support protocols, networking protocols, coherency protocols, accelerator protocols, data storage protocols, point-to-point protocols, fabric-based protocols, on-package (or on-chip) protocols, fabric-based on-package protocols, and/or the like. Non-limiting examples of supported communication protocols may include PCI, PCIe, USB, SPI, SATA, QPI, UPI, OAP, IAL, IDI, IOSF, SMI, SMI3, and/or the like. In some embodiments, link 489 and interconnect fabrics 415 and 450 may support an intra-device protocol (for instance, IDI) and a memory interconnect protocol (for instance, SMI3). In various embodiments, link 489 and interconnect fabrics 415 and 450 may support an intra-device protocol (for instance, IDI) a memory interconnect protocol (for instance, SMI3), and a fabric-based protocol (for instance, IOSF).

In some embodiments, accelerator 410 may include bus logic 435 having a device TLB 437. In some embodiments, bus logic 435 may be or may include PCIe logic. In various embodiments, bus logic 435 may communicate over interconnect 480 using a fabric-based protocol (for instance, IOSF) and/or a peripheral component interconnect express (PCIe or PCI-E) protocol. In various embodiments, communication over interconnect 480 may be used for various functions, including, without limitation, discovery, register access (for instance, registers of accelerator 410 (not shown)), configuration, initialization, interrupts, direct memory access, and/or address translation services (ATS).

Accelerator 410 may include a core 420 having a host memory cache 422 and an accelerator memory cache 424. Core 420 may communicate using interconnect 481 using, for example, an intra-device protocol (for instance, IDI) for various functions, such as coherent requests and memory flows. In various embodiments, accelerator 410 may include coherence logic 425 that includes or accesses bias mode information 427. Coherence logic 425 may communicate using interconnect 482 using, for example, a memory interconnect protocol (for instance, SMI3). In some embodiments, communication over interconnect 482 may be used for memory flows. Accelerator 410 may be operably coupled to accelerator memory 430 (for instance, as accelerator-attached memory) that may store bias information 432.

In various embodiments, host processor 445 may be operably coupled to host memory 440 and may include coherence logic (or coherence and cache logic) 455 having a last level cache (LLC) 457. Coherence logic 455 may communicate using various interconnects, such as interconnects 484 and 485. In some embodiments, interconnects 484 and 485 may include a memory interconnect protocol (for instance, SMI3) and/or an intra-device protocol (for instance, IDI). In some embodiments, LLC 457 may include a combination of at least a portion of host memory 440 and accelerator memory 430.

Host processor 445 may include bus logic 460 having an input-output memory management unit (IOMMU) 462. In some embodiments, bus logic 460 may be or may include PCIe logic. In various embodiments, bus logic 460 may communicate over interconnects 486 and 488 using a fabric-based protocol (for instance, IOSF) and/or a peripheral component interconnect express (PCIe or PCI-E) protocol. In various embodiments, host processor 445 may include a plurality of cores 465*a-n*, each having a cache 467*a-n*. In some embodiments, cores 465*a-n* may include Intel® Architecture (IA) cores. Each of cores 465*a-n* may communicate with coherence logic 455 via interconnects 487*a-n*. In some embodiments, interconnects 487*a-n* may support an intra-device protocol (for instance, IDI). In various embodiments, host processor may include a device 470 operable to communicate with bus logic 460 over interconnect 488. In some embodiments, device 470 may include an I/O device, such as a PCIe I/O device.

In some embodiments, apparatus 405 is operative to perform a coherence bias process applicable to various configurations, such as a system having an accelerator 410 and a host processor 445 (for instance, a computer processing complex that includes one or more computer processor chips), in which accelerator 410 is communicatively coupled to host processor 445 via a multi-protocol link 489 and where memory is attached directly to accelerator 410 and host processor 445 (for instance, accelerator memory 430 and host memory 440, respectively). The coherence bias process provided by apparatus 405 may provide multiple technological advantages over conventional systems, such as providing for both accelerator 410 and "host" software running on processing cores 465*a-n* to access accelerator memory 430. The coherence bias process provided by apparatus may include a host bias process and a device bias process (together, bias protocol flows) and a plurality of options for modulating and/or selecting bias protocol flows for specific memory accesses.

In some embodiments, the bias protocol flows may be implemented, at least in part, using protocol layers (for example, "bias protocol layers") on multi-protocol link 489. In some embodiments, bias protocol layers may include an intra-device protocol (for instance, IDI) and/or a memory interconnect protocol (for instance, SMI3). In some embodiments, the bias protocol flows may be enabled by using various information of the bias protocol layers, the addition of new information into the bias protocol layers, and/or the addition of support for protocols. For instance, the bias protocol flows may be implemented using existing opcodes for an intra-device protocol (for instance, IDI), the addition of opcodes to a memory interconnect protocol (for instance, SMI3) standard, and/or the addition of support for a memory interconnect protocol (for instance, SMI3) on the multi-protocol link 489 (for instance, conventional multi-protocol links may have included only an intra-device protocol (for instance, IDI) and a fabric-based protocol (for instance, IOSF)).

In some embodiments, apparatus 405 may be associated with at least one operating system (OS). The OS may be configured to not use or to not use certain portions of accelerator memory 430. Such an OS may include support for "memory only NUMA modules" (for instance, no CPU). Apparatus 405 may execute a driver (for instance, including driver 118) to perform various accelerator memory services. Illustrative and non-restrictive accelerator memory services implemented in the driver may include driver discovering and/or grabbing/allocating accelerator memory 430, providing allocation APIs and mapping pages via OS page mapping service, providing processes to manage multi-process memory oversubscription and work scheduling, providing APIs to allow software applications to set and change bias mode of memory regions of accelerator memory 430, and/or deallocation APIs that return pages to the driver's free page list and/or return pages to a default bias mode.

Figure 5A:
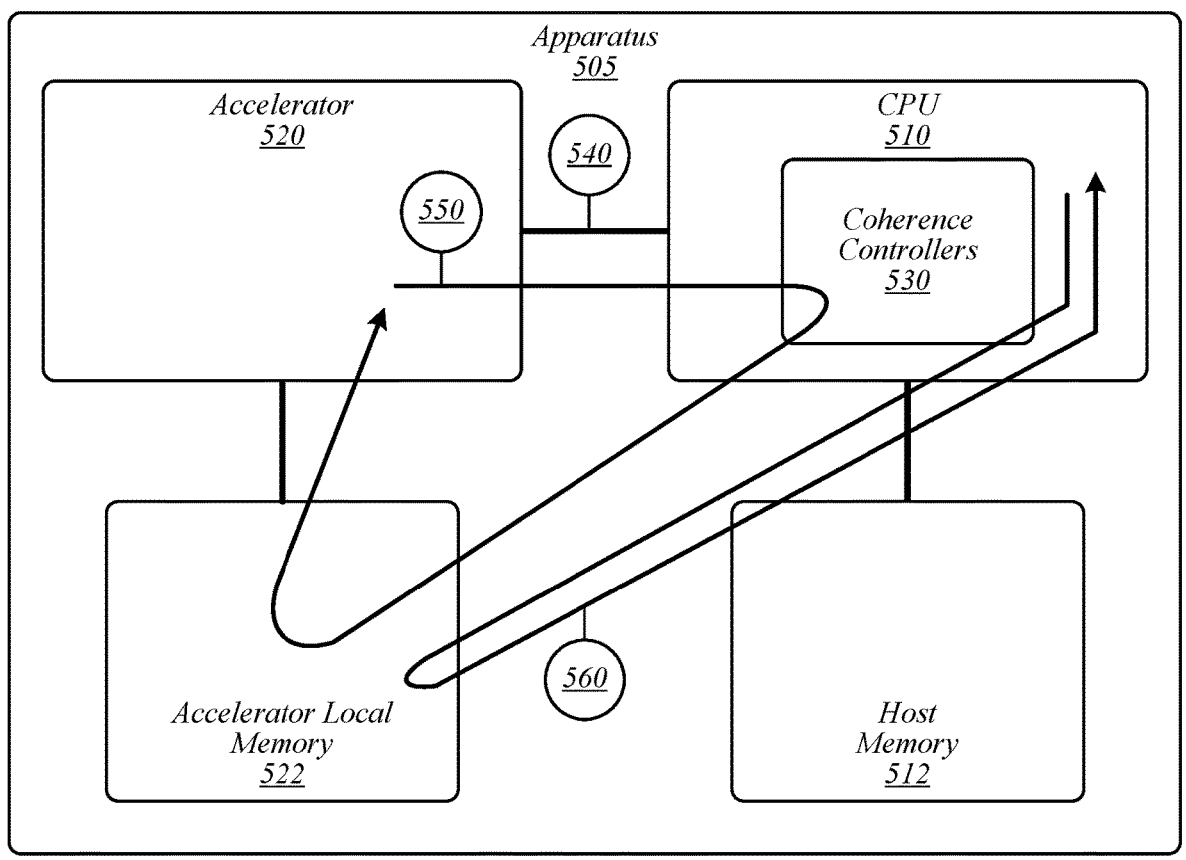
FIGS. 5A and 5B illustrate an embodiment of a fourth operating environment.

FIG. 5A illustrates an example of an operating environment 500 that may be representative of various embodiments. The operating environment 500 depicted in FIG. 5A may provide a host bias process flow according to some embodiments. As shown in FIG. 5A, an apparatus 505 may include a CPU 510 communicatively coupled to an accelerator 520 via link 540. In some embodiments, link 540 may include a multi-protocol link. CPU 510 may include coherence controllers 530 and may be communicatively coupled to host memory 512. In various embodiments, coherence controllers 530 may be operative to provide one or more standard cache coherence protocols. In some embodiments, coherence controllers 530 may include and/or be associated with various agents, such as a home agent. In some embodiment, CPU 510 may include and/or may be communicatively coupled to one or more I/O devices. Accelerator 520 may be communicatively coupled to accelerator memory 522.

Host bias process flows 550 and 560 may include a set of data flows that funnel all request to accelerator memory 522 through coherence controllers 530 in CPU 510, including requests from accelerator 520. In this manner, accelerator 522 takes a circuitous route to access accelerator memory 522, but allows accesses from both accelerator 522 and CPU 510 (including requests from I/O devices via CPU 510) to be maintained as coherent using standard cache coherence protocols of coherence controllers 530. In some embodiments, host bias process flows 550 and 560 may use an intra-device protocol (for instance, IDI). In some embodiments, host bias process flows 550 and 560 may use standard opcodes of an intra-device protocol (for instance, IDI), for example, to issue requests over multi-protocol link 540 to coherence controllers 530. In various embodiments, coherence controllers 530 may issue various coherence messages (for example, snoops) that result from requests from accelerator 520 to all peer processor chips and internal processor agents on behalf of accelerator 520. In some embodiments, the various coherence messages may include point-to-point protocol (for instance, UPI) coherence messages and/or intra-device protocol (for instance, IDI) messages.

In some embodiments, coherence controllers 530 may conditionally issue memory access messages to an accelerator memory controller (not shown) of accelerator 520 over multi-protocol link 540. Such memory access messages may be the same or substantially similar to memory access messages that coherence controllers 530 may send to CPU memory controllers (not shown), and may include new opcodes that allows data to be returned directly to an agent internal to accelerator 520, instead of forcing data to be returned to coherence controllers and then returned to accelerator 520 as an intra-device protocol (for instance, IDI) response again over multi-protocol link 540.

Host bias process flow 550 may include a flow resulting from a request or memory operation for accelerator memory 522 originating from accelerator. Host bias process pathway 560 may include a flow resulting from a request or memory operation for accelerator memory 522 originating from CPU 510 (or an I/O device or software application associated with CPU 510). When apparatus 505 is active in a host bias mode, host bias process flows 550 and 560 may be used to access accelerator memory 522 as shown in FIG. 5A. In various embodiments, in host bias mode, all request from CPU 510 that target accelerator memory 522 may be sent directly to coherence controllers 530. Coherence controllers 530 may apply standard cache coherence protocols and send standard cache coherence messages. In some embodiments, coherence controllers 530 may send memory interconnect protocol (for instance, SMI3) commands over multi-protocol link 540 for such requests, with the memory interconnect protocol (for instance, SMI3) flows returning data across multi-protocol link 540.

Figure 5B:
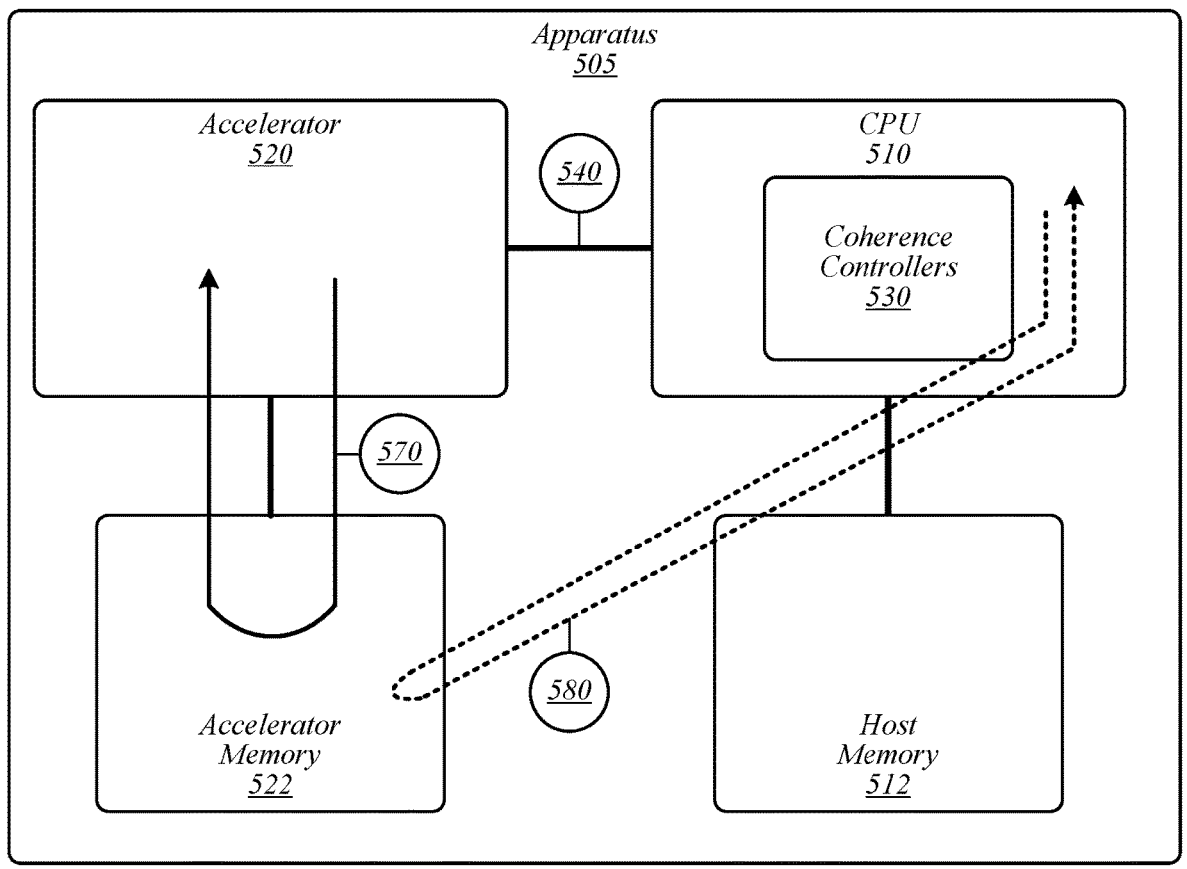

FIG. 5B illustrates an example of an operating environment 500 that may be representative of various embodiments. The operating environment 500 depicted in FIG. 5B may provide a device bias process flow according to some embodiments. As shown in FIG. 5B, when apparatus 505 is active in a device bias mode, a device bias pathway 570 may be used to access accelerator memory 522. For example, device bias flow or pathway 570 may allow accelerator 520 to directly access accelerator memory 522 without consulting coherence controllers 530. More specifically, a device bias pathway 570 may allow accelerator 520 to directly access accelerator memory 522 without having to send a request over multi-protocol link 540.

In device bias mode, CPU 510 requests for accelerator memory may be issued the same or substantially similar as described for host bias mode according to some embodiments, but are different in the memory interconnect protocol (for instance, SMI3) portion of pathway 580. In some embodiments, in device bias mode, CPU 510 requests to attached memory may be completed as though they were issued as "uncached" (or cacheable) requests. In general, data of uncached requests during device bias mode is not cached in the CPUs cache hierarchy. In this manner, accelerator 520 is allowed to access data in accelerator memory 522 during device bias mode without consulting coherence controllers 530 of CPU 510. In some embodiments, uncached requests may be implemented on the CPU 510 intra-device protocol (for instance, IDI) bus. In various embodiments, uncached requests may be implemented using a globally observed, use once (GO-UO) protocol on the CPU 510 intra-device protocol (for instance, IDI) bus. For example, a response to a cacheable request may return a piece of data to CPU 510 and instruct CPU 510 to only use the piece of data once, for instance, to prevent caching of the piece of data and to force the use of an uncached data flow.

In some embodiments, apparatus 505 and/or CPU 510 may not support GO-UO. In such embodiments, uncached flows (for example, pathway 580) may be implemented using multi-message response sequences on a memory interconnect protocol (for instance, SMI3) of multi-protocol link 540 and CPU 510 intra-device protocol (for instance, IDI) bus. For instance, when CPU 510 is targeting a "device bias" page of accelerator 520, accelerator 520 may set up one or more states to block future requests to the target memory region (for instance, a cache line) from accelerator 520 and send a "device bias hit" response on the memory interconnect protocol (for instance, SMI3) line of multi-protocol link 540. In response to the "device bias hit" message, coherence controller 530 (or agents thereof) may return data to a requesting processor core, followed immediately by a snoop-invalidate message. In some embodiments, a CLFLUSH message (for example, over the intra-device protocol (for instance, IDI or IAL.cache)) bus may be used instead of a snoop-invalidate message. When the corresponding processor core acknowledges that snoop-invalidate is complete, coherence controller 530 (or agents thereof) may send a "device bias block complete" message to accelerator 520 on the memory interconnect protocol (for instance, SMI3) line of multi-protocol link 540. In response to receiving the "device bias block complete" message, accelerator may clear the corresponding blocking state.

Referring to FIG. 4, bias mode information 427 may include a bias indicator configured to indicate an active bias mode (for instance, device bias mode or host bias mode). The selection of the active bias mode may be determined by the bias information 432. In some embodiments, bias information 432 may include a bias table. In various embodiments, the bias table may include bias information 432 for certain regions of accelerator memory, such as pages, lines, and/or the like. In some embodiments, the bias table may include bits (for example, 1 or 3 bits) per accelerator memory 430 memory page. In some embodiments, the bias table may be implemented using RAM, such as SRAM at accelerator 410 and/or a stolen range of accelerator memory 430, with or without caching inside accelerator 410.

In some embodiments, bias information 432 may include bias table entries in the bias table. In various embodiments, the bias table entry associated with each access to accelerator memory 430 may be accessed prior to the actual access of accelerator memory 430. In some embodiments, local requests from accelerator 410 that find their page in device bias may be forwarded directly to accelerator memory 430. In various embodiments, local requests from accelerator 410 that find their page in host bias may be forwarded to host processor 445, for instance, as an intra-device protocol (for instance, IDI) request on multi-protocol link 489. In some embodiments, host processor 445 requests, for instance, using memory interconnect protocol (for instance, SMI3), that find their page in device bias may complete the request using an uncached flow (for instance, pathway 580 of FIG. 5B). In some embodiments, host processor 445 requests, for instance, using memory interconnect protocol (for instance, SMI3), that find their page in host bias may complete the request as a standard memory read of accelerator memory (for instance, via pathway 560 of FIG. 5A).

The bias mode of a bias indicator of bias mode information 427 of a region of accelerator memory 430 (for instance, a memory page) may be changed via a software-based system, a hardware-assisted system, a hardware-based system, or a combination thereof. In some embodiments, the bias indicator may be changed via an application programming interface (API) call (for instance, OpenCL), which in turn may call the accelerator 410 device driver (for instance, driver 118). The accelerator 410 device driver may send a message (or enqueue a command descriptor) to accelerator 410 directing accelerator 410 to change the bias indicator. In some embodiments, a change in the bias indicator may be accompanied by a cache flushing operation in host processor 445. In various embodiments, a cache flushing operation may be required for a transition from host bias mode to device bias mode, but may not be required for a transition from device bias mode to host bias mode. In various embodiments, software may change a bias mode of one or more memory regions of accelerator memory 430 via a work request transmitted to accelerator 430.

In certain cases, software may not be able to or may not be able to easily determine when to make a bias transition API call and to identify memory regions requiring bias transition. In such cases, accelerator 410 may provide a bias transition hint process in which accelerator 410 determines a need for a bias transition and sends a message to an accelerator driver (for instance, driver 118) indicating the need for the bias transition. In various embodiments, the bias transition hint process may be activated responsive to a bias table lookup that triggers accelerator 410 accesses to host bias mode memory regions or host processor 445 accesses to device bias mode memory regions. In some embodiments, the bias transition hint process may signal the need for a bias transition to the accelerator driver via an interrupt. In various embodiments, the bias table may include a bias state bit to enable bias transition state values. The bias state bit may be used to allow access to memory regions during the process of a bias change (for instance, when caches are partially flushed and incremental cache pollution due to subsequent requests must be suppressed).

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
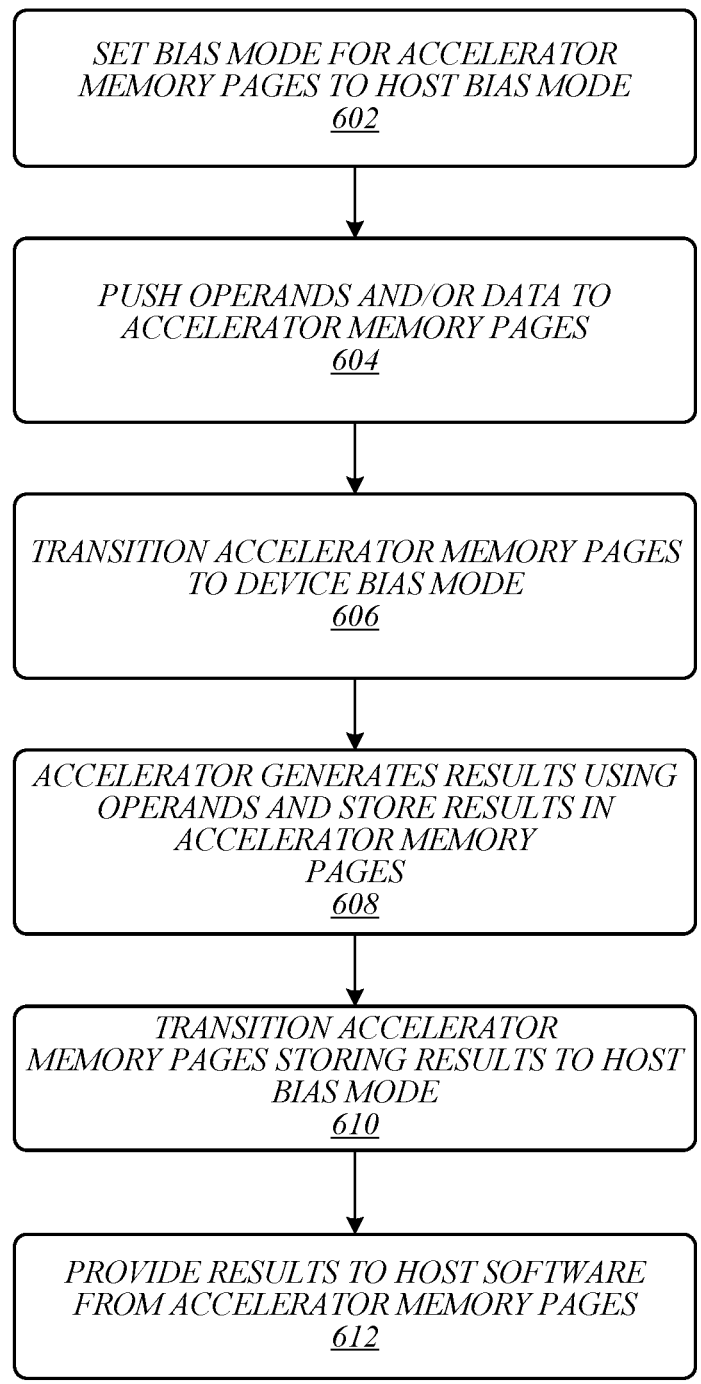
FIG. 6 illustrates an embodiment of a first logic flow.

FIG. 6 illustrates an embodiment of a logic flow 600. The logic flow 600 may be representative of some or all of the operations executed by one or more embodiments described herein, such as apparatus 105, 305, 405, and 505. In some embodiments, logic flow 600 may be representative of some or all of the operations for a coherence bias process according to some embodiments.

As shown in FIG. 6, logic flow 600 may set a bias mode for accelerator memory pages to host bias mode at block 602. For example, a host software application (for instance, software application 140) may set the bias mode of accelerator device memory 430 to host bias mode via a driver and/or API call. The host software application may use an API call (for instance, an OpenCL API) to transition allocated (or target) pages of accelerator memory 430 storing the operands to host bias. Because the allocated pages are transitioning from device bias mode to host bias mode, no cache flushes are initiated. The device bias mode may be specified in a bias table of bias information 432.

At block 604, logic flow 600 may push operands and/or data to accelerator memory pages. For example, accelerator 420 may perform a function for CPU requiring certain operands. The host software application may push operands to allocated pages of accelerator memory 430 from a peer CPU core (for instance, core 465a). Host processor 445 may generate operand data in allocated pages in accelerator memory 430 (and in arbitrary locations in host memory 440).

Logic flow 600 may transition accelerator memory pages to device bias mode at block 606. For example, the host software application may use an API call to transition operand memory pages of accelerator memory 430 to device bias mode. When device bias transition is complete, host software application may submit work to accelerator 430. The accelerator 430 may execute the function associated with the submitted work without host-related coherence overhead. In addition, the software application may use an API call to cause a work descriptor submission to flush operand pages from host cache. In some embodiments, cache flush may be executed using a cache (or cache line) flush routine (such as CLFLUSH) on an intra-device protocol (for instance, IDI) protocol.

Logic flow 600 may generate results using operands via accelerator and store the results in accelerator memory pages at block 608. For example, accelerator 420 may perform a function (for instance, a floating-point operation, graphics calculation, FFT operation, and/or the like) using operands to generate results. The results generated by the function may be stored in allocated accelerator memory 430 pages.

Logic flow may set the bias mode for accelerator memory pages storing results to host bias mode at block 610. For example, the host software application may use an API call to transition operand memory pages of accelerator memory 430 to host bias mode, without causing coherence processes and/or cache flushing actions. Host CPU 445 may access, cache, and share results. At block 612, logic flow 600 may provide results to host software from accelerator memory pages. For example, the host software application may access the results directly from accelerator memory pages 430. In some embodiments, allocated accelerator memory pages may be released by logic flow. For example, the host software application may use a driver and/or API call to release the allocated memory pages of accelerator memory 430.

Figure 7:
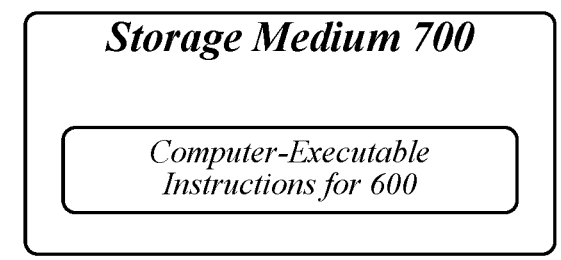
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
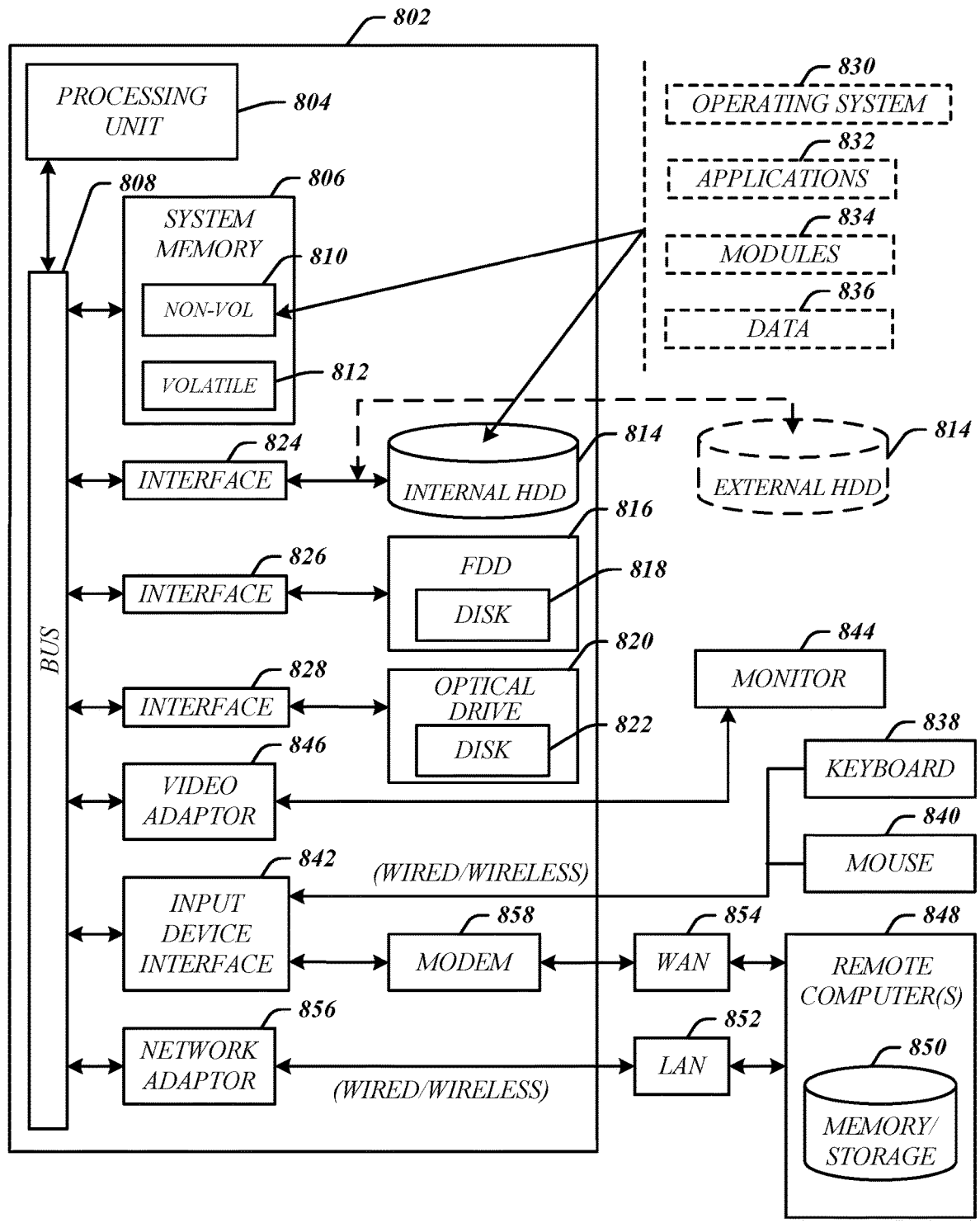
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of apparatus 105, 305, 405, and/or 505. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of apparatus 105, 305, 405, and/or 505.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1384 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

The following include examples according to some embodiments:

Example 1 is an apparatus to provide coherence bias for accessing accelerator memory, the apparatus comprising at least one processor, a logic device communicatively coupled to the at least one processor, a logic device memory communicatively coupled to the logic device, and logic, at least a portion comprised in hardware, the logic to receive a request to access the logic device memory from the logic device, determine a bias mode associated with the request, and provide the logic device with access to the logic device memory via a device bias pathway responsive to a determination that the bias mode is a device bias mode.

Example 2 is the apparatus of Example 1, the logic device comprising an accelerator.

Example 3 is the apparatus of Example 1, the logic device memory comprising an accelerator memory.

Example 4 is the apparatus of Example 1, the logic device comprising an accelerator and the logic device memory comprising an accelerator memory.

Example 5 is the apparatus of Example 1, the bias mode comprising one of a host bias mode and the device bias mode.

Example 6 is the apparatus of Example 1, the logic to provide the logic device with access to the logic device memory via a host bias pathway responsive to a determination that the bias mode is a device bias mode responsive to a determination that the bias mode is a host bias mode.

Example 7 is the apparatus of Example 1, the logic to receive a request to access the logic device memory from the at least one processor, and provide data from the logic device memory to the at least one processor as an uncached request responsive to a determination that the bias mode is a device bias mode.

Example 8 is the apparatus of Example 1, the logic device communicatively coupled to the at least one processor via a multi-protocol link operative to support a plurality of communication protocols, the plurality of communication protocols comprising at least two of an intra-device protocol, a memory interconnect protocol, or a fabric-based protocol.

Example 9 is the apparatus of Example 1, the at least one processor comprising at least one coherency controller operative to provide at least one standard cache coherency protocol.

Example 10 is the apparatus of Example 1, the at least one processor comprising at least one coherency controller operative to provide at least one standard cache coherency protocol, the logic to provide the logic device with access to the logic device memory via a host bias pathway responsive to a determination that the bias mode is a device bias mode responsive to a determination that the bias mode is a host bias mode, the host bias pathway flowing at least partially through the at least one coherency controller.

Example 11 is the apparatus of Example 1, the logic to determine the bias mode based on a bias indicator.

Example 12 is the apparatus of Example 1, the logic to determine the bias mode via a bias table comprising a bias indicator for a plurality of regions of the logic device memory.

Example 13 is the apparatus of Example 1, the logic to receive a request to transition the bias mode from a first bias mode to a second bias mode.

Example 14 is the apparatus of Example 1, the logic to perform a cache flushing operation responsive to a transition of the bias mode from a host bias mode to a device bias mode.

Example 15 is a system, comprising the apparatus according to any of examples 1-14, and at least one transceiver.

Example 16 is a method to provide coherence bias for accessing accelerator memory, the method comprising, by at least one processor communicatively coupled to a logic device receiving a request from the logic device to access a logic device memory communicatively coupled to the logic device, determining a bias mode associated with the request, and providing the logic device with access to the logic device memory via a device bias pathway responsive to a determination that the bias mode is a device bias mode.

Example 17 is the method of Example 16, the logic device comprising an accelerator.

Example 18 is the method of Example 16, the logic device memory comprising an accelerator memory.

Example 19 is the method of Example 16, the logic device comprising an accelerator and the logic device memory comprising an accelerator memory.

Example 20 is the method of Example 16, the bias mode comprising one of a host bias mode and the device bias mode.

Example 21 is the method of Example 16, comprising providing the logic device with access to the logic device memory via a host bias pathway responsive to a determination that the bias mode is a device bias mode responsive to a determination that the bias mode is a host bias mode.

Example 22 is the method of Example 16, comprising receiving a request to access the logic device memory from the at least one processor, and providing data from the logic device memory to the at least one processor as an uncached request responsive to a determination that the bias mode is a device bias mode.

Example 23 is the method of Example 16, the logic device communicatively coupled to the at least one processor via a multi-protocol link operative to support a plurality of communication protocols, the plurality of communication protocols comprising at least two of an intra-device protocol, a memory interconnect protocol, or a fabric-based protocol.

Example 24 is the method of Example 16, the at least one processor comprising at least one coherency controller operative to provide at least one standard cache coherency protocol.

Example 25 is the method of Example 16, the at least one processor comprising at least one coherency controller operative to provide at least one standard cache coherency protocol, comprising providing the logic device with access to the logic device memory via a host bias pathway responsive to a determination that the bias mode is a device bias mode responsive to a determination that the bias mode is a host bias mode, the host bias pathway flowing at least partially through the at least one coherency controller.

Example 26 is the method of Example 16, comprising determining the bias mode based on a bias indicator.

Example 27 is the method of Example 16, comprising determining the bias mode via a bias table comprising a bias indicator for a plurality of regions of the logic device memory.

Example 28 is the method of Example 16, comprising receiving a request to transition the bias mode from a first bias mode to a second bias mode.

Example 29 is the method of Example 16, comprising performing a cache flushing operation responsive to a transition of the bias mode from a host bias mode to a device bias mode.

Example 30 is a computer-readable storage medium that stores instructions for execution by processing circuitry of a computing device to provide coherence bias for accessing accelerator memory, the instructions to cause the computing device to receive a request, from a logic device communicatively coupled to the processing circuitry, to access a logic device memory communicatively coupled to the logic device, determine a bias mode associated with the request, and provide the logic device with access to the logic device memory via a device bias pathway responsive to a determination that the bias mode is a device bias mode.

Example 31 is the computer-readable storage medium of Example 30, the logic device comprising an accelerator.

Example 32 is the computer-readable storage medium of Example 30, the logic device memory comprising an accelerator memory.

Example 33 is the computer-readable storage medium of Example 30, the logic device comprising an accelerator and the logic device memory comprising an accelerator memory.

Example 34 is the computer-readable storage medium of Example 30, the bias mode comprising one of a host bias mode and the device bias mode.

Example 35 is the computer-readable storage medium of Example 30, the instructions to cause the computing device to provide the logic device with access to the logic device memory via a host bias pathway responsive to a determination that the bias mode is a device bias mode responsive to a determination that the bias mode is a host bias mode.

Example 36 is the computer-readable storage medium of Example 30, the instructions to cause the computing device to receive a request to access the logic device memory from the at least one processor, and provide data from the logic device memory to the at least one processor as an uncached request responsive to a determination that the bias mode is a device bias mode.

Example 37 is the computer-readable storage medium of Example 30, the logic device communicatively coupled to the processing circuitry via a multi-protocol link operative to support a plurality of communication protocols, the plurality of communication protocols comprising at least two of an intra-device protocol, a memory interconnect protocol, or a fabric-based protocol.

Example 38 is the computer-readable storage medium of Example 30, the at least one processor comprising at least one coherency controller operative to provide at least one standard cache coherency protocol.

Example 39 is the computer-readable storage medium of Example 30, the at least one processor comprising at least one coherency controller operative to provide at least one standard cache coherency protocol, the instructions to cause the computing device to provide the logic device with access to the logic device memory via a host bias pathway responsive to a determination that the bias mode is a device bias mode responsive to a determination that the bias mode is a host bias mode, the host bias pathway flowing at least partially through the at least one coherency controller.

Example 40 is the computer-readable storage medium of Example 30, the instructions to cause the computing device to determine the bias mode based on a bias indicator.

Example 41 is the computer-readable storage medium of Example 30, the instructions to cause the computing device to determine the bias mode via a bias table comprising a bias indicator for a plurality of regions of the logic device memory.

Example 42 is the computer-readable storage medium of Example 30, the instructions to cause the computing device to receive a request to transition the bias mode from a first bias mode to a second bias mode.

Example 43 is the computer-readable storage medium of Example 30, the instructions to cause the computing device to perform a cache flushing operation responsive to a transition of the bias mode from a host bias mode to a device bias mode.

Example 44 is an apparatus to provide coherence bias for accessing accelerator memory, the apparatus comprising a request management means to receive a request to access a logic device memory from a logic device, a bias determination means to determine a bias mode associated with the request, and a memory access means to provide the logic device with access to the logic device memory via a device bias pathway responsive to a determination that the bias mode is a device bias mode.

Example 45 is the apparatus of Example 44, the logic device comprising an accelerator.

Example 46 is the apparatus of Example 44, the logic device memory comprising an accelerator memory.

Example 47 is the apparatus of Example 44, the logic device comprising an accelerator and the logic device memory comprising an accelerator memory.

Example 48 is the apparatus of Example 44, the bias mode comprising one of a host bias mode and the device bias mode.

Example 49 is the apparatus of Example 44, the memory access means to provide the logic device with access to the logic device memory via a host bias pathway responsive to a determination that the bias mode is a device bias mode responsive to a determination that the bias mode is a host bias mode.

Example 50 is the apparatus of Example 44, the request management means to receive a request to access the logic device memory from at least one processor communicatively coupled to the logic device, and the memory access means to provide data from the logic device memory to the at least one processor as an uncached request responsive to a determination that the bias mode is a device bias mode.

Example 51 is the apparatus of Example 44, the logic device communicatively coupled to at least one processor via a multi-protocol link operative to support a plurality of communication protocols, the plurality of communication protocols comprising at least two of an intra-device protocol, a memory interconnect protocol, or a fabric-based protocol.

Example 52 is the apparatus of Example 44, comprising at least one processor comprising at least one coherency controller operative to provide at least one standard cache coherency protocol.

Example 53 is the apparatus of Example 44, comprising at least one processor comprising at least one coherency controller operative to provide at least one standard cache coherency protocol, the memory access means to provide the logic device with access to the logic device memory via a host bias pathway responsive to a determination that the bias mode is a device bias mode responsive to a determination that the bias mode is a host bias mode, the host bias pathway flowing at least partially through the at least one coherency controller.

Example 54 is the apparatus of Example 44, the bias determination means to determine the bias mode based on a bias indicator.

Example 55 is the apparatus of Example 44, the bias determination means to determine the bias mode via a bias table comprising a bias indicator for a plurality of regions of the logic device memory.

Example 56 is the apparatus of Example 44, the bias determination means to receive a request to transition the bias mode from a first bias mode to a second bias mode.

Example 57 is the apparatus of Example 44, comprising a cache flushing means to perform a cache flushing operation responsive to a transition of the bias mode from a host bias mode to a device bias mode.

Example 58 is a system, comprising the apparatus according to any of examples 44-57, and at least one transceiver.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus to provide coherence bias for accessing accelerator memory, the apparatus comprising:
    at least one processor;
    a logic device communicatively coupled to the at least one processor;
    a logic device memory communicatively coupled to the logic device, the logic device memory to store bias information; and
    logic, at least a portion comprised in hardware, the logic to:
        receive a request to access the logic device memory from the logic device,
        determine a bias mode associated with the request based on the bias information stored in the logic device memory, and
        provide the logic device with access to the logic device memory via a device bias pathway responsive to the bias mode being a device bias mode.

2. The apparatus of claim 1, the logic device comprising an accelerator and the logic device memory comprising an accelerator memory.

3. The apparatus of claim 1, the bias mode comprising one of a host bias mode and the device bias mode.

4. The apparatus of claim 1, the logic to provide the logic device with access to the logic device memory via a host bias pathway responsive to the bias mode being a host bias mode.

5. The apparatus of claim 1, the logic to:
    receive a request to access the logic device memory from the at least one processor, and
    provide data from the logic device memory to the at least one processor as an uncached request responsive to the bias mode being a device bias mode.

6. The apparatus of claim 1, the logic device communicatively coupled to the at least one processor via a multi-protocol link operative to support a plurality of communication protocols, the plurality of communication protocols comprising at least two of an intra-device protocol, a memory interconnect protocol, or a fabric-based protocol.

7. The apparatus of claim 1, the at least one processor comprising at least one coherency controller operative to provide at least one standard cache coherency protocol,
    the logic to provide the logic device with access to the logic device memory via a host bias pathway responsive to the bias mode being a host bias mode, the host bias pathway flowing at least partially through the at least one coherency controller.

8. The apparatus of claim 1, the logic to determine the bias mode via a bias table comprising a bias indicator for a plurality of regions of the logic device memory.

9. The apparatus of claim 1, the logic to receive a request to transition the bias mode from a first bias mode to a second bias mode.

10. The apparatus of claim 1, the logic to perform a cache flushing operation responsive to a transition of the bias mode from a host bias mode to a device bias mode.

11. A method to provide coherence bias for accessing accelerator memory, the method comprising:
    receiving a request to access a logic device memory from a logic device communicatively coupled to the logic device memory, the logic device communicatively coupled to at least one processor;
    determining a bias mode associated with the request based on bias information stored in the logic device memory; and
    providing the logic device with access to the logic device memory via a device bias pathway responsive to the bias mode being a device bias mode.

12. The method of claim 11, the logic device comprising an accelerator and the logic device memory comprising an accelerator memory.

13. The method of claim 11, the bias mode comprising one of a host bias mode and the device bias mode.

14. The method of claim 11, comprising providing the logic device with access to the logic device memory via a host bias pathway responsive to the bias mode being a host bias mode.

15. The method of claim 11, comprising:
receiving a request to access the logic device memory from the at least one processor, and
providing data from the logic device memory to the at least one processor as an uncached request responsive to the bias mode being a device bias mode.

16. The method of claim 11, the logic device communicatively coupled to the at least one processor via a multi-protocol link operative to support a plurality of communication protocols, the plurality of communication protocols comprising at least two of an intra-device protocol, a memory interconnect protocol, or a fabric-based protocol.

17. The method of claim 11, comprising providing the logic device with access to the logic device memory via a host bias pathway responsive to the bias mode being a host bias mode, the host bias pathway flowing at least partially through at least one coherency controller of the at least one processor, the at least one coherency controller operative to provide at least one standard cache coherency protocol.

18. The method of claim 11, comprising determining the bias mode via a bias table comprising a bias indicator for a plurality of regions of the logic device memory.

19. The method of claim 11, comprising receiving a request to transition the bias mode from a first bias mode to a second bias mode.

20. The method of claim 11, comprising performing a cache flushing operation responsive to a transition of the bias mode from a host bias mode to a device bias mode.

21. A non-transitory computer-readable storage medium that stores instructions for execution by processing circuitry of a computing device to provide coherence bias for accessing accelerator memory, the instructions to cause the computing device to:
receive a request to access a logic device memory from a logic device communicatively coupled to the logic device memory, the logic device communicatively coupled to at least one processor;
determine a bias mode associated with the request based on bias information stored in the logic device memory; and
provide the logic device with access to the logic device memory via a device bias pathway responsive to the bias mode being a device bias mode.

22. The computer-readable storage medium of claim 21, the logic device comprising an accelerator and the logic device memory comprising an accelerator memory.

23. The computer-readable storage medium of claim 21, the bias mode comprising one of a host bias mode and the device bias mode.

24. The computer-readable storage medium of claim 21, the instructions to cause the computing device to:
receive a request to access the logic device memory from the at least one processor, and
provide data from the logic device memory to the at least one processor as an uncached request responsive to the bias mode being a device bias mode.

25. The computer-readable storage medium of claim 21, the instructions to cause the computing device to provide the logic device with access to the logic device memory via a host bias pathway responsive to the bias mode being a host bias mode, the host bias pathway flowing at least partially through at least one coherency controller of the at least one processor, the at least one coherency controller operative to provide at least one standard cache coherency protocol.

* * * * *